(12) United States Patent
Sheblak et al.

(10) Patent No.: US 8,411,092 B2
(45) Date of Patent: Apr. 2, 2013

(54) 2D IMPOSTERS FOR SIMPLIFYING PROCESSING OF PLURAL ANIMATION OBJECTS IN COMPUTER GRAPHICS GENERATION

(75) Inventors: John Sheblak, Austin, TX (US); Tim Little, Georgetown, TX (US)

(73) Assignee: Nintendo Co., Ltd., Kyoto (JP)

(*) Notice: Subject to any disclaimer, the term of this patent is extended or adjusted under 35 U.S.C. 154(b) by 142 days.

(21) Appl. No.: 12/814,949

(22) Filed: Jun. 14, 2010

(65) Prior Publication Data

US 2011/0306417 A1 Dec. 15, 2011

(51) Int. Cl.
  *G06T 17/00* (2006.01)
  *G06T 13/00* (2011.01)
(52) U.S. Cl. .................................. 345/428; 345/473
(58) Field of Classification Search .................. None
  See application file for complete search history.

(56) References Cited

U.S. PATENT DOCUMENTS

| | | | | | |
|---|---|---|---|---|---|
| 5,999,879 | A | * | 12/1999 | Yano | 701/454 |
| 6,008,820 | A | * | 12/1999 | Chauvin et al. | 345/502 |
| 6,226,000 | B1 | | 5/2001 | Richens et al. | |
| 6,400,373 | B1 | * | 6/2002 | Uchiyama et al. | 345/629 |
| 7,019,742 | B2 | | 3/2006 | Le Ouay | |
| 2003/0120391 | A1 | | 6/2003 | Saito | |
| 2003/0184603 | A1 | * | 10/2003 | Marshall et al. | 345/958 |
| 2004/0141014 | A1 | | 7/2004 | Kamiwada et al. | |
| 2004/0217970 | A1 | * | 11/2004 | Fujita | 345/589 |
| 2005/0035980 | A1 | | 2/2005 | Lonsing | |
| 2005/0110789 | A1 | | 5/2005 | Le Ouay | |
| 2007/0206003 | A1 | * | 9/2007 | Yoshida et al. | 345/419 |

OTHER PUBLICATIONS

Jun et al., "Real-time visualization of virtual geographic environment using the view-dependent simplification method", Geoinformatics 2008 and Joint Conference on GIS and Built Environment: Geo-Simulation and Virtual GIS Environments, Proc. of SPIE vol. 7143.*
Aubel, A. et al., Animated Impostors for Real-time Display of Numerous Virtual Humans, Proc. Virtual Worlds, (Jul. 1-10, 1998).
Aubel, A., et al., "Lowering the Cost of Virtual Human Rendering With Structured Animated Imposters," Proc. WSCG (Feb. 1999).
Aubel, et al., "Real-time Display of Virtual Humans: Levels of Details and Imposters," IEEE Transactions on circuits and Systems for Video Technology. pp. 1-25 (2000).

(Continued)

*Primary Examiner* — Daniel Hajnik
(74) *Attorney, Agent, or Firm* — Nixon & Vanderhye P.C.

(57) ABSTRACT

The technology herein involves use of 2D imposters to achieve seemingly 3D effects with high efficiency where plural objects such as animated characters move together such as when one character follows or carries another character. A common 2D imposter or animated sprite is used to image and animate the plural objects in 2D. When the plural objects are separated in space, each object can be represented using its respective 3D model. However, when the plural objects contact one another, occupy at least part of the same space, or are very close to one other (e.g., as would arise in a situation when the plural objects are moving together in tandem), the animation system switches from using plural respective 3D models to using a common 2D model to represent the plural objects. Such use of a common 2D model can be restricted in some implementations to situations where the user's viewpoint can be restricted to be at least approximately perpendicular to the plane of 2D model, or the 2D surface on which the combined image is texture mapped can be oriented in response to the current virtual camera position.

22 Claims, 12 Drawing Sheets

OTHER PUBLICATIONS

Chang, Chun-Fa, Gary Bishop, Anselmo Lastra. "LDI Tree: A Hierarchical Representation for Image-Based Rendering." In the Proceedings of SIGGRAPH: 291-298 (1999).

Hoff III, Kenneth E. et al. "Environment-Mapped Cell Texture Representations to Alleviate "Popping" and Facilitate Paging." nd. Available at http://www.cs.unc.edu/about.hoff/research/walkthru/popping.sub.--pres/sl-ide0.html, 2003.

Maciel, Paulo W.C. and Peter Shirley, "Visual Navigation of Large Environments Using Textured Clusters." Symposium on Interactive 3D Graphics (Apr.): 95-102, 211 (1995).

Oliveira, Manual M. and Gary Bishop. 1999. "Image-Based Objects." In the proceedings of ACM Symposium on Interactive 3D Graphics. (Apr.): 9pp (1999).

Rotenberg, Steve. CSE 191A: Seminar on Video Game Programming. "Lecture2: Scene Management." 26pp of slide reproductions (2003).

Schaufler, Gernot, "Dynamically Generated Impostors." MVD Workshop (Nov.): 129-136 (1995).

Schaufler, Gernot and Wolfgang Sturzlinger, "A Three Dimensional Image Cache for Virtual Reality." In the proceedings of EUROGRAPHICS. (Aug.):11pp (1996).

Shade, Jonathan et al., "Hierarchical Image Caching for Accelerated Walkthroughs of Complex Environments." In the proceedings of SIGGRAPH: 8pp (1996).

Sillion, Francois, Georges Drettakis, Benoit Bodelet, "Efficient Imposter Manipulation for Real-Time Visualization of Urban Scenery." In the proceedings of EUROGRAPHICS. (Sep.):16:3, 12pp (1997).

Tecchia, Franco, Celine Loscos, Yiorgos Chrysanthou, "Image-Based Crowd Rendering." Computer Graphics. 7pp (2002).

Kacmarcik, Gary et al., "Introducing Computer Programming via Gameboy Advance Homebrew," SIGCSE '09, Chattanooga, TN (Mar. 3-7, 2009).

Wikipedia article, http://en.wikipedia.org/wiki/Sprite_%28computer_graphics%29, "Sprite (computer graphics)" (Mar. 17, 2011).

Bousseau, Andrien et al., "Interactive watercolor rendering with temporal coherence and abstraction," Association for Computing Machinery, Inc., NPAR 2006, Annecy, France (Jun. 5-7, 2006).

Hery, Christophe et al., "Crowd Systems at ILM," Industrial Light & Magic (Apr. 15, 2004).

Hery, Christophe et al., "Advanced RenderMan 3: Render Harder," Chapter 4, Tutorial on Procedural Primitives, SIGGRAPH 2001 Course 48 (Aug. 2001).

Lippman, Seth, "Crowds in Shrek 2," PDI/DreamWorks (2004).

Musse, Soraia Raupp et al., "Crowd and Group Simulation" (2004).

Musse, Soraia Raupp et al., "Hierarchical Model for Real Time Simulation of Virtual Human Crowds," IEEE Transactions on Visualization and Computer Graphics, vol. 7 No. 2, pp. 152-164 (Apr.-Jun. 2001).

Risser, Eric, "Rendering 3D Volumes Using Per-Pixel Displacement Mapping," Sandbox Symposium 2007, San Diego, CA, Association for Computing Machinery, Inc. (Aug. 4-5, 2007).

Ulicny, Branislav et al., "Course Notes on Real-Time Crowds: Scenario Authoring," (2004).

Wei, Xiaoming, et al., "Simulating Fire With Texture Splats," IEEE Visualization 2002, Boston, MA (Oct. 27-Nov. 1, 2002).

"Virtual Humans: Individuals, Groups, and Crowds" Slides, Course 33: Crowd and Group Animation, SIGGRAPH (2004).

\* cited by examiner

2D IMPOSTERS FOR SIMPLIFYING PROCESSING OF PLURAL ANIMATION OBJECTS IN COMPUTER GRAPHICS GENERATION

CROSS-REFERENCES TO RELATED APPLICATIONS

STATEMENT REGARDING FEDERALLY SPONSORED RESEARCH OR DEVELOPMENT

FIELD

The technology herein relates to computer graphics and animation, and more particularly to improved techniques for rendering animation in a manner that is computationally efficient and visually pleasing. Still more particularly, the technology herein relates to dynamically using imposters or 2D sprites to efficiently render multiple animated objects for animated films, simulations, computer-generated presentations, video games and other animated applications.

BACKGROUND AND SUMMARY

Computer animation has revolutionized the entertainment industry. Moviegoers are now treated to fantastic visual worlds that previously existed only in the mind's eye. Gamers can play amazingly immersive games on computers, video game consoles, handheld devices and other appliances. Training simulators are so realistic that it has become hard to distinguish the real thing from the simulation. Many years of intensive effort by computer scientists as well as advances in graphics hardware capabilities and power have brought these changes about.

The first computer graphics systems were two-dimensional systems. They represented and displayed objects in 2D. Some such interactive graphics systems used sprites (small 2D images that could be positioned at any desired location on the display) to render moving objects over a fixed background image from a fixed viewpoint. Such technology was consistent with the relatively low-performance graphics hardware available at the time.

As graphics processing capabilities and performance increased, developers began developing animations based on 3D models. Such 3D models generally used polygons to represent 3D objects in a 3D virtual world. These 3D objects could be rendered from any desired viewpoint, with graphics hardware taking care of automatically transforming the geometry of the object to accommodate different viewpoints. Such 3D graphics were much more immersive than 2D graphics at the cost of increased hardware and processing complexity.

However, even with increased graphics processing capabilities, there sometimes are advantages to conserving processing and memory resources and reducing graphics processing complexity. Because rendering human and other complex animated characters based on 3D models can be computationally and storage capacity intensive, the art has developed a technique sometimes referred to as "imposters" for use in certain circumstances where three-dimensional effects are not so important. These so-called "imposters" are two-dimensional models that the animation program can selectively substitute for three-dimensional models. The 2D models are projected into 3D space for certain well-defined purposes. Much like texture mapping (where 2-D images are used to provide a higher degree of image complexity without corresponding increase in number of polygons or vertices), the use of imposters can provide highly visually complex and interesting effects without corresponding increased polygon count and associated computational complexity. Furthermore, such 2D imposter models can be animated to provide motion and action. See e.g., Schaufler, Gernot and Wolfgang Sturzlinger, "A Three Dimensional Image Cache for Virtual Reality" Proceedings of EUROGRAPHICS (August 1996). Such 2D animation provides a high degree of image complexity and interest at relatively small polygon count (e.g., one or two polygons per object). Textures are often still images whereas imposters can be animated, and imposters are typically used to subtly replace corresponding 3D objects during animation whereas textures are often used in conjunction with 3D imaging (e.g., to supply wood grain on the 3D surfaces of a table, etc.). Texture mapping and imposter technology can be used together.

One interesting use of "imposters" is in scenes that show large crowds of people. While it is possible to use 3-D rendering techniques to render each person in the crowd, separately 3D modeling and rendering thousands of people in a crowd could be very computationally intensive and storing all those 3D models could take up lots of memory. Especially when the rendering occurs on relatively low-power computing hardware and/or where there are memory constraints, there is an advantage in substituting or using two-dimensional models in place of three-dimensional models when performing such crowd rendering.

It is also possible to dynamically switch between a 3-D model of a particular animated object and the 2-D imposter of that object on an as-needed basis. For example, when an animated object is in the foreground of a scene and is interacting with other aspects of the scene, it may be desirable to render the image of that object from a three-dimensional model. On the other hand, if the animated object then moves (or by change of viewpoint is moved) into the background of the scene so that three-dimensional depth and other 3-D aspects of the animated character can no longer be discerned and/or are no longer as important, it is possible to substitute a 2-D imposter for the 3-D construct and realize a corresponding decrease in computations required to render the image.

As one simple example, each of many faces of a large crowd in a sports stadium could be rendered using 2D imposter models. If the virtual camera is zoomed in on one or a small number of the faces in the crowd, 3D models could be dynamically substituted and the viewer would see the corresponding richness and depth provided by the 3D models. Note that in this example, computational complexity would be manageable because by zooming in on only a few faces, the system would no longer need to image hundreds of faces in the crowd. Once the virtual camera is zoomed back out to achieve a wider angle view, the 2D imposter models could again be substituted in place of the 3D models to continue to maintain computational complexity at acceptable levels.

Because imposters generally do not have depth, they have not generally been used in 3D graphics generation when collision detection is involved. Many systems do assign imposters or 2D sprites a planar depth (i.e., a single z value that applies to the entire 2D image) so that hidden surface removal can place one 2D sprite in front of another. Such capabilities along with transparency can provide what is sometimes referred to as 2½D depth effects. However, in a 3D graphics system, when collision detection is needed to check spatial interference between two 3D objects, generally speaking such collision is usually or often performed in 3D space based on the 3D models of the respective objects.

Exemplary illustrative non-limiting technology herein uses imposters is a different way to achieve seemingly 3D effects with high efficiency. Consider where plural objects such as animated characters move together and occupy the same or nearly the same 3D space such as when one character follows or carries another character, or where one character happens to follow the other in for example a multiplayer gaming context. In such situations, it may be relatively computationally intensive to use conventional 3D collision detection techniques to continually determine points of intersection between the plural objects and remove appropriate hidden surfaces, especially if the two characters are independently controlled by different users in an interactive graphics generating environment. Under such circumstances, the exemplary illustrative non-limiting implementation uses a common 2D imposter or animated sprite to image and animate the plural objects in 2D. Thus, when the plural objects are separated in space, each object can be represented using its respective 3D model. However, when the plural objects contact one another, occupy at least part of the same space, or are very close to one other (e.g., as would arise in a situation when the plural objects are moving together in tandem or substantially in tandem), the animation system switches from using plural respective 3D models to using a common 2D model for rendering the plural objects.

Such use of a common 2D model can be restricted in some implementations to situations where the user's viewpoint can be restricted to be at least approximately perpendicular to the plane of 2D model, and/or the 2D model can be oriented so its plane is perpendicular to the direction of the virtual camera.

By using a common 2D model as described above, complex collision detection and sorting can be averted and there is no need to maintain detailed depth information (e.g., as in z-texturing) distinguishing depths of different parts of the plural objects—even if in a multiplayer or other environment when there may be no way to predict the display order ahead of time. Furthermore, in some illustrative implementations, the 2D model can have a planar depth that allows the graphics system to perform collision detection and hidden surface removal with respect to other objects in the 3D virtual world (e.g., so the plural objects moving in tandem can together move behind other objects and in front of other objects). Thus, in some illustrative implementations, the graphics system can continue to perform 3D collision detection and hidden surface removal between the 2D representation and other, 3D objects. However, the graphics system is relieved of the burden of having to detect collisions between the plural objects moving in tandem and performing associated hidden surface removal and other 3D processing with respect to those plural objects. This reduces processing complexity and memory loading, freeing up resources to permit more complex 3D backgrounds or the like.

One aspect of the exemplary illustrative technology herein provides a method that in use is performed by a computer animation and graphics generation system of the type including a processor, a 3D graphics processor coupled to said processor, and a memory coupled to at least the processor, said 3D graphics processor generating image information for display. The method for animating plural 3D moving objects may comprise determining whether said plural 3D moving objects overlap; if said plural 3D moving objects overlap, substituting use of a 2D imposter model common to said overlapping plural 3D moving objects in place of respective 3D models of said plural 3D objects; processing said 2D imposter model within a 3D world; and generating an image of said plural moving objects based on said 2D imposter model for display at least in part in response to said processing.

Apparatus and storage media are also provided herein.

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 7A-1 shows exemplary texture mapping data structures;

DETAILED DESCRIPTION

Figure 1:
FIGS. 1 & 2 show exemplary illustrative non-limiting screen images of two animated characters represented by 3D models occupying the same space, where collision detection fails and the characters appear to be unitary.

FIG. 1 shows an example image 40 produced by a graphics and animation system 1. Two animated characters (in this case a large monkey 50 ("Donkey Kong") and a small monkey 52 ("Diddy Kong") move through a three-dimensional world 54. In one example implementation, animated character 50 can be controlled by one game player input, and animated character 52 can be controlled by another game player input. When these two animated characters 50, 52 are controlled begin moving in tandem, they have substantially the same 3D coordinates in three dimensional space and can interfere with one another. If they were in the real world, however, the two characters 50, 52 could never occupy exactly the same space in three dimensions but rather one might stand or walk right next to the other. Since it may not be possible in a simple multiplayer gaming environment for game players to control or worry about the depths (z) of their respective characters and in any event expect system 1 to provide photorealism, it is desirable that system 1 will be able to automatically process the two characters 50, 52 so they remain distinct and independent characters in the resulting image.

Figure 2:

For example, it may be that two independent game players position their respective characters so they occupy precisely the same or overlapping space in the 3D world. This can result in the two animated characters 50, 52 appearing to be united as one single object as shown in FIGS. 1 and 2. The visual effect is aesthetically unpleasing and not realistic since in the real world the two characters would never actually merge with one another but rather would remain distinct and could never occupy exactly the same space at exactly the same time. Separating the two animated characters 50, 52 based on their 3D polygon representations using conventional 3D collision detection and hidden surface removal techniques is possible but is relatively computationally intensive.

To efficiently avoid such undesired occurrences, the exemplary illustrative non-limiting implementation under certain circumstances subtly replaces the 3D object representations of the animated characters 50, 52 with one or more 2D "imposter" object(s) that is common to the plural animated characters. The resulting common 2D representation is like a thin wall or billboard. The exemplary illustrative non-limiting implementation can dynamically substitute the 2D representation for the plural 3D representations if for example the plural animated 3D objects exist in substantially the same 3D coordinates or within a short distance from one another so the 3D objects overlap in 3D space.

Figure 3:
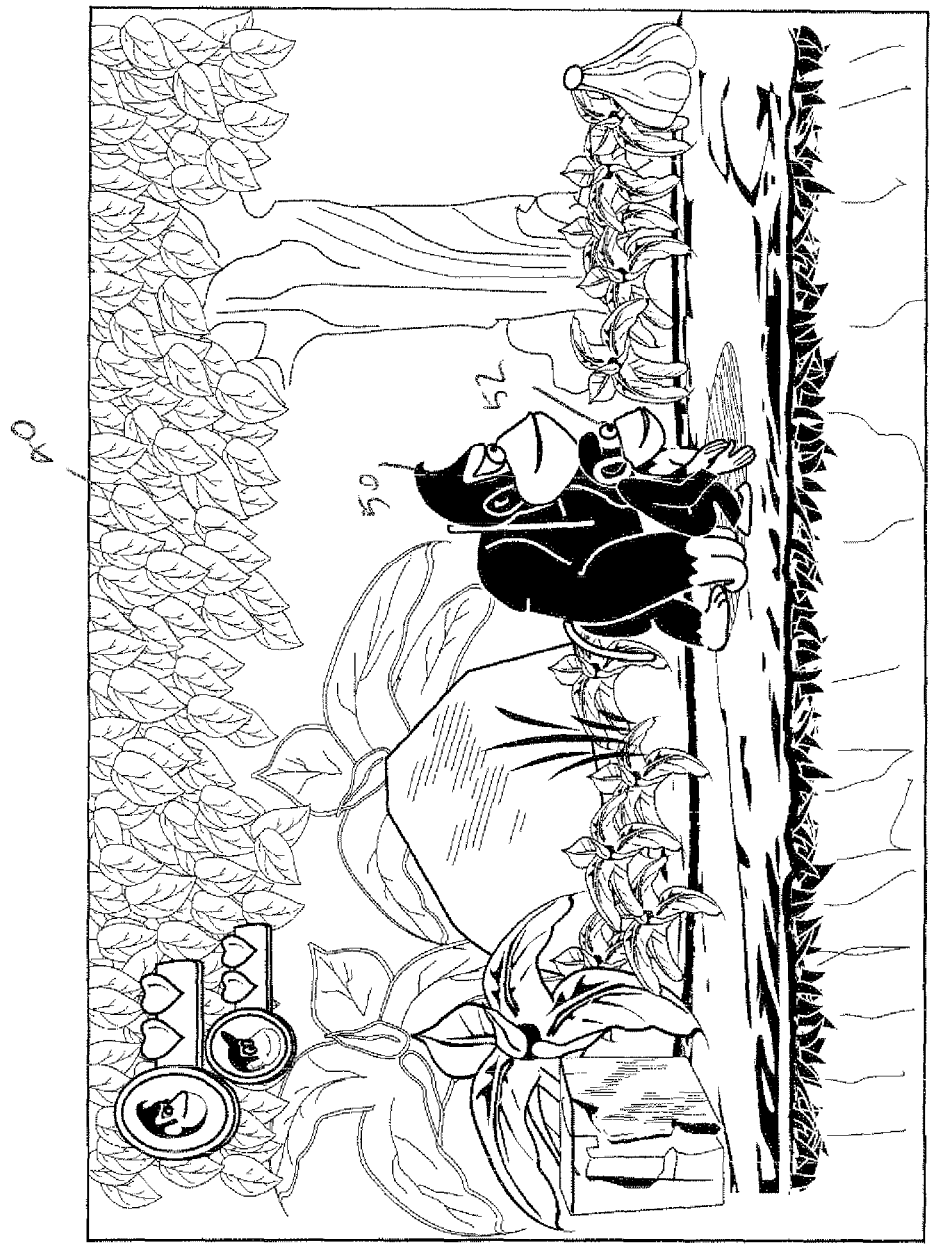
FIGS. 3 & 4 show exemplary illustrative non-limiting screen images of two animated characters in the same location and represented by a common 2D model or imposter.

An example resulting image based on the 3D imposter is shown in FIG. 3. In this case, plural animated characters 50, 52 are represented by a 2D planar (e.g., texture mapped) object in which the two animated characters are drawn as if one is in front of the other and they are walking side by side. In this example, the 2D wall object or imposter represents the situation where one character 52 exists in front and another character 50 exists in back. The resulting image shows the two animated characters 50, 52 appearing distinct from one another and not merging into one another even though their 3D representations may overlap or even be coextensive in 3D space.

Figure 4:

FIG. 4 shows the image resulting from the 2D wall object or imposter from a different viewpoint. FIG. 4 thus illustrates what is actually going on—namely that the plural characters 50, 52 are being imaged based on a common 2D representation that appears like a thin wall or billboard. For example, the 2D object may comprise a planar surface such as a quad in 3D space, and the images of the plural characters may be texture mapped onto the planar surface. Transparency and alpha blending may be used to ensure that portions of the 2D object not occupied by part of the image of characters 50, 52 may be "see through" so as not to obstruct the user's view of objects behind the planar object in 3D space. Thus, the two characters 50, 52 are in fact occupying the very same (planar) space in the 3D world, but the resulting image seen by the user makes the two characters appear to be distinct and non-interfering due e.g. to the ultimate 2D projection used for generating a display.

Figure 5:
FIG. 5 shows an exemplary illustrative non-limiting screen image of the two animated characters represented by 3D models when the characters are not in proximity to one another.

In exemplary illustrative non-limiting implementations, the user's viewpoint is restricted so the user never sees the animated characters 50, 52 from viewpoints such as shown in FIG. 4. Rather, in the exemplary illustrative non-limiting implementation, viewpoint is restricted to be generally perpendicular to the orientation of the plane of the common 2D object whenever the 2D representation is used in place of the 3D representations. For example, if the user is able to and begins to change the viewpoint in an interactive system so that the viewpoint is no longer substantially perpendicular to the 2D imposter, the system can subtly switch to 3D representations of the animated characters 50, 52 to preserve photorealism. Then, if the user changes the viewpoint again to provide substantial perpendicularly to the 2D imposter model, the system can again subtly substitute the 2D model for the 3D models. Similarly, as shown in FIG. 5, if the animated characters 50, 52 are controlled such that are no longer occupying the same space, the system can begin representing the characters with respective 3D models and cease using the common 2D representation.

Exemplary Graphics & Animation Rendering System

Figure 6A:
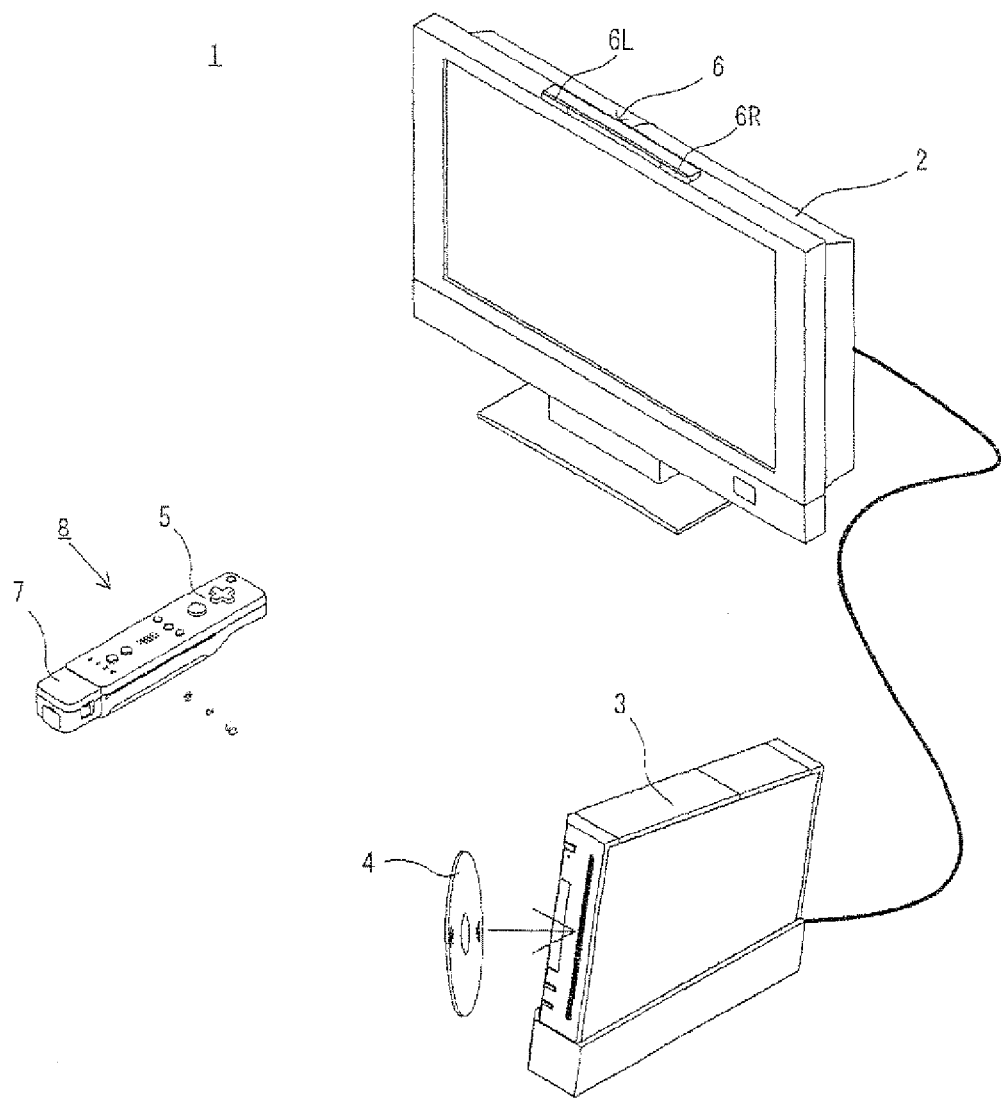
FIG. 6A-6B show an exemplary illustrative non-limiting animation and graphics generation system for use with the exemplary illustrative non-limiting implementation.

With reference to FIG. 6A, an exemplary illustrative non-limiting animation and graphics generation system 1 is shown in an external view of the game system 1. As shown in FIG. 6A, the system 1 includes a television receiver (hereinafter, simply referred to as a "television") or other display 2, a processing unit apparatus 3, an optical disc 4, one or plural input device(s) 8 (e.g., one for each of multiple players), and a marker section 6. In this system, the processing unit 3 performs an animation and graphic generation process in response to a user manipulation of input devices 8, but in other implementations that system 1 does not necessarily need to respond in real time to user input in an interactive manner but can instead generate graphics based on a predetermined schedule e.g., to show a movie or video presentation.

In the system 3, the optical disc 4 typifying an information storage medium used for the system 3 in an exchangeable manner is detachably inserted. A program executed by the system 3 is stored in the optical disc 4. The system 3 has, on the front surface thereof, an insertion opening for the optical disc 4. The system 3 reads and executes the game program stored in the optical disc 4 which is inserted through the insertion opening, so as to perform the game process. Other implementations can store the program on any volatile or non-volatile storage device including a ROM cartridge, a flash memory, a downloadable RAM memory, etc.

The system 3 is connected to the television 2, which is an exemplary display device, through a connecting cord. A game image obtained as a result of the process performed by the system 3 is displayed on the television 2. Further, the marker section 6 is provided on the periphery (in FIG. 6A, on a portion above a screen) of a screen of the television 2. The marker section 6 includes two markers 6R and 6L on both ends thereof. Specifically, the marker 6R (as well as the marker 6L) includes one or more infrared LED, and emits an infrared light forward from the television 2. The marker section 6 is connected to the system 3, and the system 3 is able to control each infrared LED of the marker section 6 so as to light each infrared LED up.

The input device 8 provides the system 3 with operation data representing a content of an operation performed on the input device 8 itself. In the present embodiment, the input device 8 includes a controller 5 and an accelerometer and/or gyro sensor (inertial measurement) unit 7. As described in detail below, the input device 8 is structured such that the sensor unit 7 may be detachably connected to the controller 5 or alternatively can be built into the controller. Radio communication is used between the controller 5 and the system 3. The radio communication between the controller 5 and the system 3 is uses, for example, Bluetooth (Registered Trademark) technology. In another embodiment, connection between the controller 5 and the system 3 may be a wired connection.

Figure 6B:
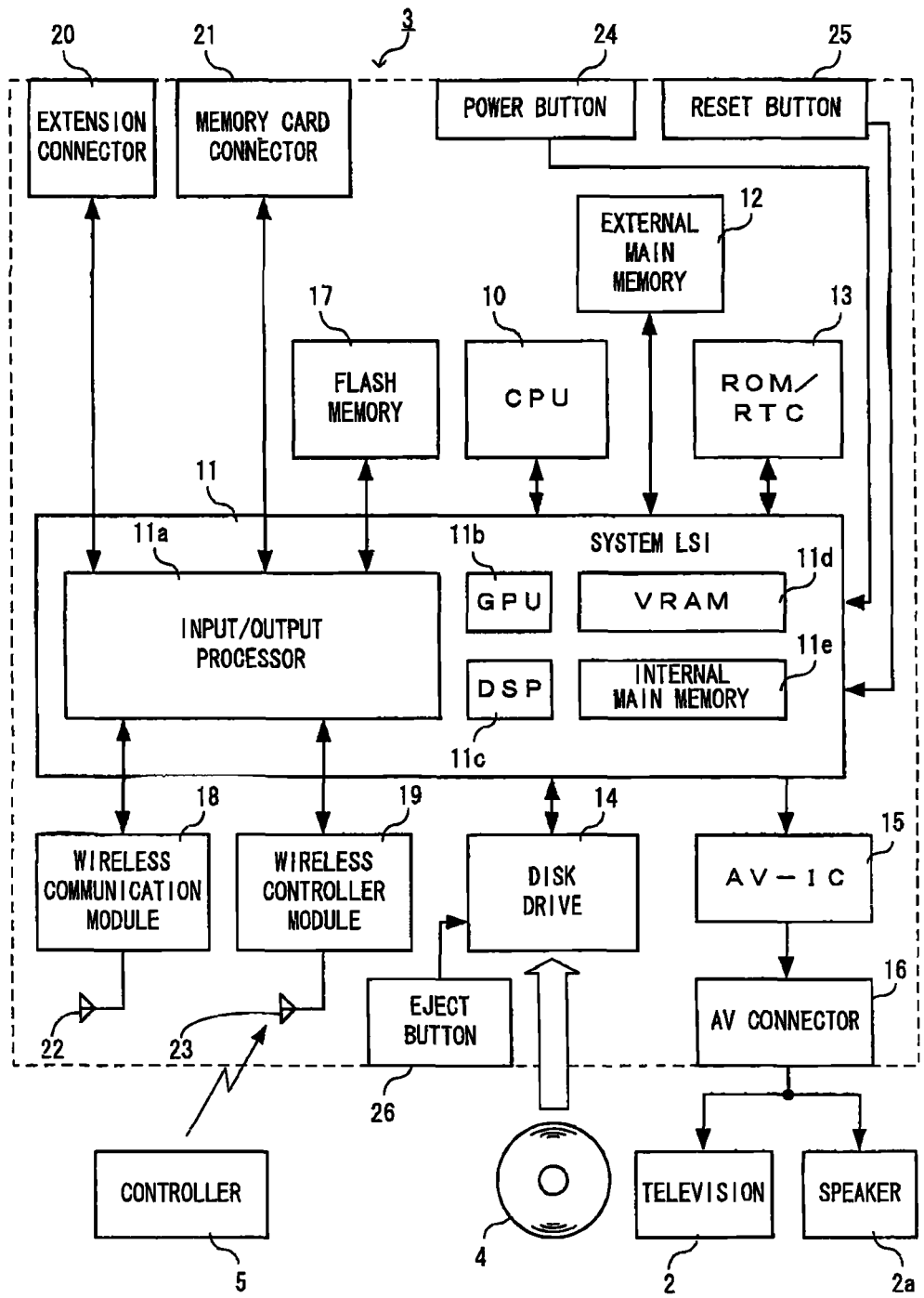

Next, an internal structure of the system 3 will be described with reference to FIG. 6B. FIG. 6B is a block diagram illustrating a structure of the system 3. The system 3 includes the CPU 10, a system LSI 11, an external main memory 12, a ROM/RTC 13, a disk drive 14, an AV-IC 15, and the like.

The CPU 10, functioning as an animation processor, performs a process by executing the program stored in the optical disc 4. The CPU 10 is connected to the system LSI 11. To the system LSI 11, the external main memory 12, the ROM/RTC 13, the disk drive 14, and the AV-IC 15 as well as the CPU 10 are connected. The system LSI 11 performs processes for controlling data transmission between the respective components connected thereto, generating an image to be displayed, acquiring data from an external device, and the like. The internal structure of the system LSI will be described below. The external main memory 12 of a volatile type stores a program such as a program read from the optical disc 4 and a program read from a flash memory 17, and various data, and the external main memory 12 is used as a work area and a buffer area for the CPU 10. The ROM/RTC 13 includes a ROM (so-called a boot ROM) incorporating a boot program for the system 3, and a clock circuit (RTC: Real Time Clock)

for counting time. The disk drive 14 reads program data, texture data, and the like from the optical disk 4, and writes the read data into an internal main memory 11e or the external main memory 12 described below.

The system LSI 11 includes an input/output processor (I/O processor) 11a, a GPU (Graphics Processor Unit) 11b, a DSP (Digital Signal Processor) 11c, a VRAM 11d, and the internal main memory 11e. These component 11a, 11b, 11c, 11d, and 11e are connected with each other through an internal bus, which is not shown.

The GPU 11b, acting as a part of rendering means, generates an image in accordance with a graphics command (rendering command) from the CPU 10. The VRAM 11d stores data (data such as polygon data and texture data) necessary for the GPU 11b to execute the graphics command. Such GPU processing can include for example texture mapping, projection of 3D surfaces on a 2D viewing plane, shading, lighting, rasterization, etc. as well known to those skilled in the art. When an image is generated, the GPU 11b generates image data by using data stored in the VRAM 11d.

The DSP 11c, functioning as an audio processor, generates audio data by using sound data and sound waveform (tone quality) data stored in the internal main memory 11e or the external main memory 12.

The image data and the audio data generated as described above are read by the AV-IC 15. The AV-IC 15 outputs the read image data to the television 2 through an AV connector 16, and outputs the read audio data to a speaker 2a incorporated in the television 2. Thus, an image is displayed on the television 2, and a sound is outputted from the speaker 2a.

The input/output processor 11a performs data transmission to and data reception from the component connected thereto, and download of data from an external device. The input/output processor 11a is connected to the flash memory 17, a wireless communication module 18, a wireless controller module 19, an extension connector 20, and a memory card connector 21. The wireless communication module 18 is connected to an antenna 22, and the wireless controller module 19 is connected to an antenna 23.

The input/output processor 11a is connected to a network via the wireless communication module 18 and the antenna 22, so as to communicate with another system and various servers connected to the network. The input/output processor 11a regularly accesses the flash memory 17, and detects for data which needs to be transmitted to the network, and transmits, when the data is detected, the data to the network through the wireless communication module 18 and the antenna 22. Further, the input/output processor 11a receives data transmitted from another system, and/or download data from a download server, through the network, the antenna 22, and the wireless communication module 18, and stores the received data and/or the downloaded data in the flash memory 17. The CPU 10 executes a game program so as to read data stored in the flash memory 17 and use the data on the game program. The flash memory 17 may store saved data (game result data or intermediate step data) of a game played by using the system 3 in addition to data transmitted from the system 3 to another system or the various servers, and data received by the system 3 from another system or the various servers.

The input/output processor 11a receives operation data transmitted from the controller 5 through the antenna 23 and the wireless controller module 19, and (temporarily) stores the received operation data in a buffer area of the internal main memory 11e or the external main memory 12.

Further, the input/output processor 11a is connected to the extension connector 20 and the memory card connector 21.

The extension connector 20 is a connector for interface, such as a USB or a SCSI, and allows communication with the network by connecting thereto a media such as an external storage media, connecting thereto a peripheral device such as another controller, and/or connecting thereto a wired communication connector, without using the wireless communication module 18. The memory card connector 21 is a connector for connecting thereto an external storage media such as a memory card. For example, the input/output processor 11a accesses an external storage media through the extension connector 20 or the memory card connector 21 so as to store data in the external storage media or read data from the external storage media.

The system 3 includes a power button 24, a reset button 25, and an eject button 26. The power button 24 and the reset button 25 are connected to the system LSI 11. When the power button 24 is on, power is supplied to the respective components of the system 3 through an AC adaptor not shown. When the reset button 25 is pressed, the system LSI 11 reboots a boot program of the system 3. The eject button 26 is connected to the disk drive 14. When the eject button 26 is pressed, the optical disc 4 is ejected from the disk drive 14.

Exemplary 2D Models or Imposters

Figures 1, 7A:
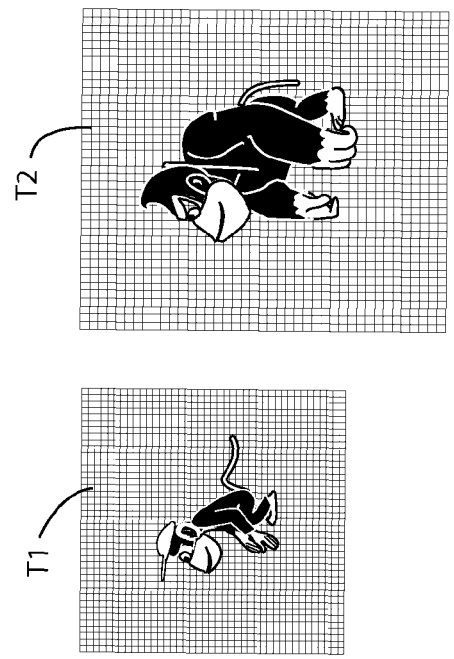
FIGS. 7A-7D show exemplary illustrative non-limiting construction of 2D imposters.
Figure 7A:

FIG. 7A shows respective 2D images for two respective characters 50, 52. These respective 2D images or "cels" can be derived from or used to create respective sprite sheets, i.e., collections or sequences of 2D images of each character in different positions that can be used to supply animation. In one example implementation, the FIG. 7A 2D images can be dynamically generated by processor 10 or GPU 11b projecting 3D models of the two characters 50, 52 to create corresponding 2D images (with surrounding alpha transparency) and storing these images in VRAM 11d as texture map(s) for texture mapping by GPU 11b. FIG. 7A-1 shows exemplary such sprite sheet texture maps T1, T2 obtained by projecting 3D representations of the two characters 50, 52 onto flat surfaces—essentially by removing the Z (depth) coordinate and overwriting based on closer Z having priority.

Figure 7C:
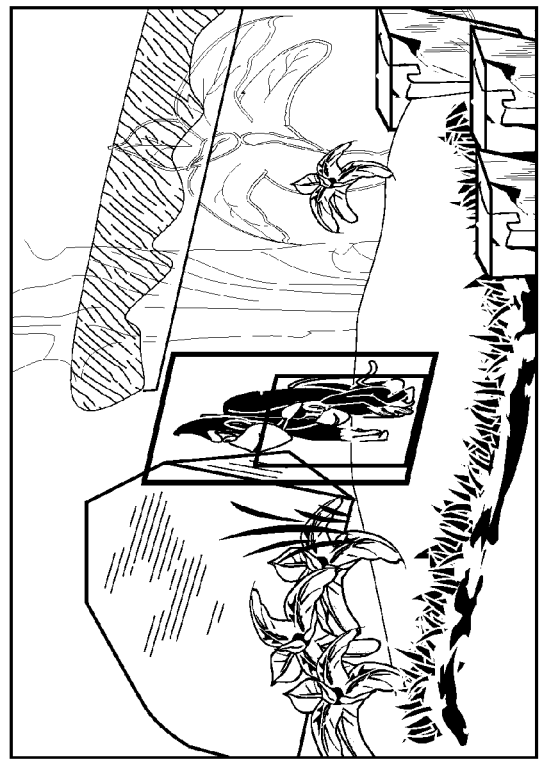
Figure 7B:

Such cels as shown in FIG. 7A can be combined to create an imposter 2D data structure shown in FIG. 7B. In the example shown, the 2D images are superimposed onto one another with the 2D image of the character in front by e.g., overwriting the 2D image of the character in back. If desired, this superimposition can be performed without any collision detection since which image is in front and which is behind can be predetermined and fixed, by for example multi-texturing or by superimposing the two images before texture mapping. One way of looking at what is happening is that the two 3D models of the respective characters 50, 52 are projected ("flattened") onto the same 3D planar surface, with the software declaring one of the characters (e.g., the smaller one 52) "in front" and thus overwriting conflicting pixels or texels of the other character to provide appropriate hidden surface removal.

Figure 7D:
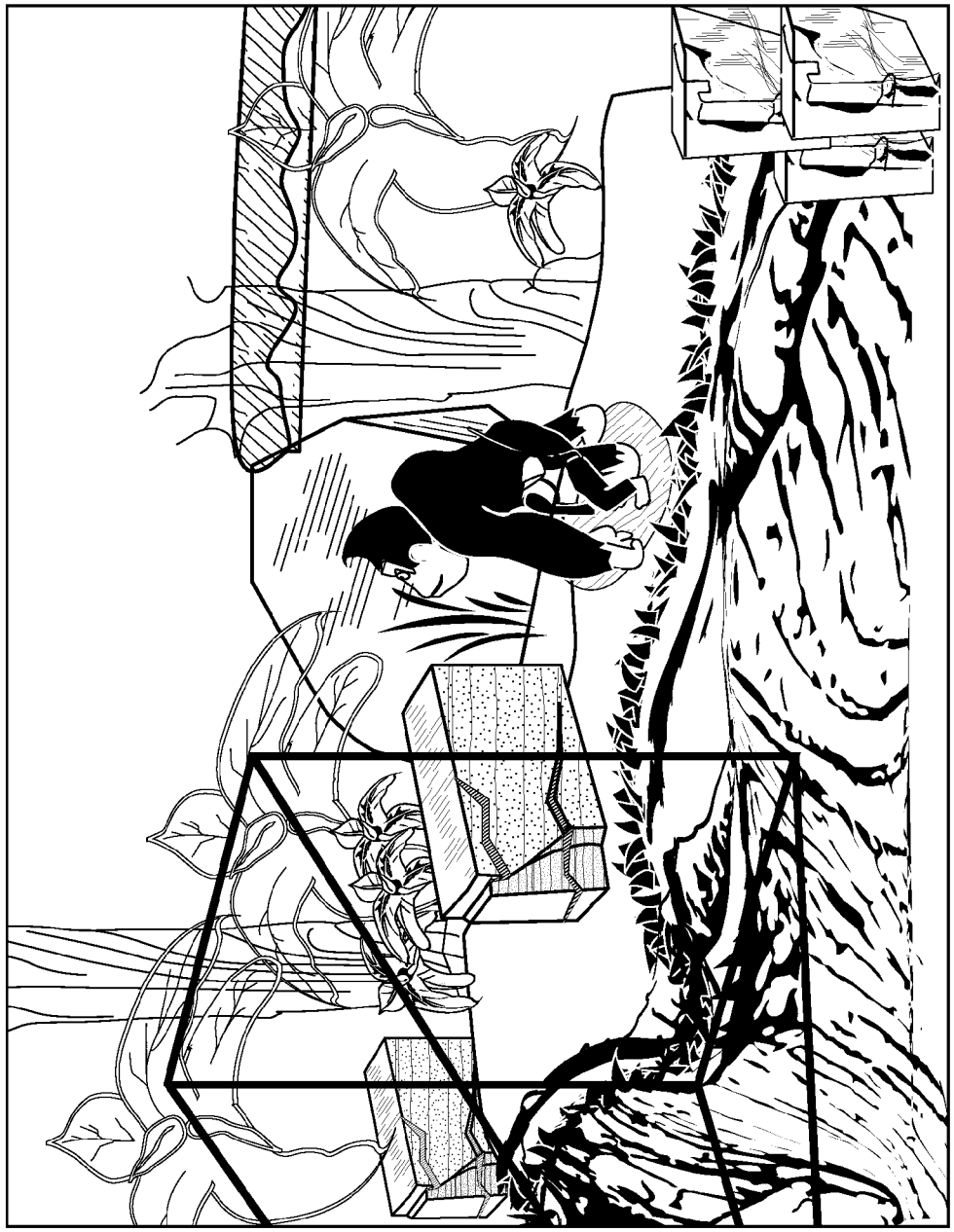

The resulting 2D image(s) can be texture-mapped onto a quad or other planar surface (e.g., a rectangle or a pair of triangles sharing a common side) positioned in the 3D world as shown in FIG. 7C. Then, the viewing frustum can be constrained to be in the direction as shown in FIG. 7D relative to the quad to ensure photorealism. During image generation, a sequence of 2D "cel" images from a sprite sheet or the like can thus be texture-mapped onto the 2D object to provide animation effects.

Figure 8:
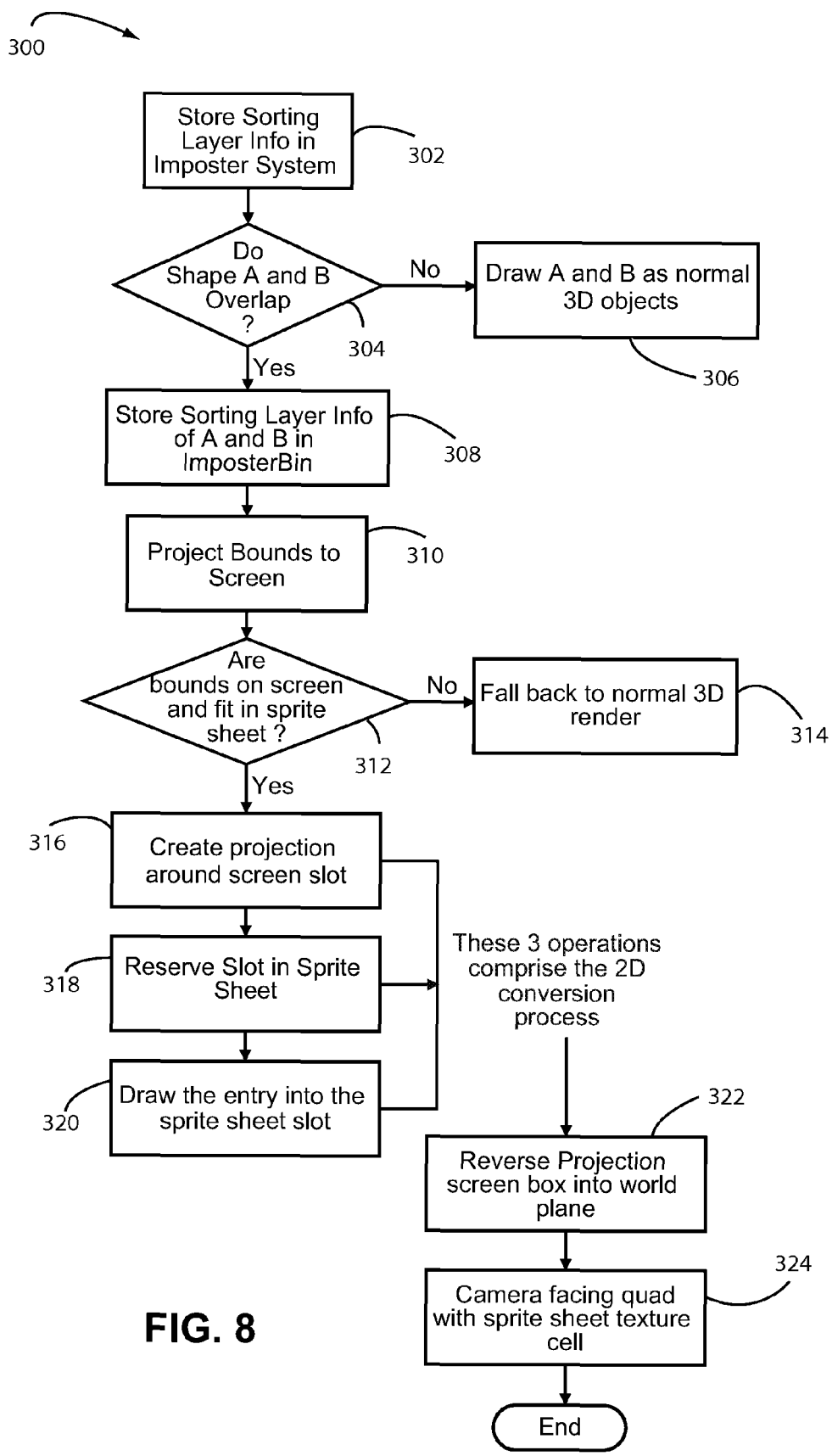
FIG. 8 shows an exemplary illustrative non-limiting flowchart of example program control steps.

FIG. 8 is a flowchart of exemplary illustrative non-limiting computer controlled steps for performing animation as described herein. The steps shown in FIG. 8 are represented by computer instructions that are stored in a volatile or non-volatile memory device and executed by the animation system processor 10 to effect animation. Here's how the FIG. 8 process flow works in the exemplary illustrative non-limiting implementation:

1. For each player P:
   Store Sorting Layer Info in ImposterBin (the Imposter System) (block 302) (e.g., if character 52 is supposed to be in front of character 50 when the two are travelling in tandem)
2. For each object pair A, B:
   Do 3D Bounds of A and B overlap? (block 304) (this test can be performed e.g., using for example a 3D bounding box test)
   NO: Draw A and B as normal 3D objects based on typical 3D representations (block 306).
   YES: Store Sorting Layer Info of A and B in ImposterBin (block 308) (this information can also be used to define the depth of a 2D surface in the 3D world so the imaged objects A and B can be behind some world objects and in front of some other world objects).
3. For each entry in ImposterBin:
   Project Bounds to Screen (block 310)
   Are bounds on screen and fit in sprite sheet? (block 312)
      NO: Fall back to normal 3D rendering (block 314) since 3D rendering tools can be used e.g., to perform cut plane processing etc.
      YES (bound are on screen and fit in sprite sheet):
         Create projection around screen slot (block 316)
         Reserve Slot in Sprite Sheet (block 318)
         Draw the entry into the sprite sheet slot (block 320).
         (The above-described three operations 316, 318, 320 accomplish dynamic 2D conversion of a 3D model(s) or other asset, and in some implementations can thus project a 3D model onto a 2D surface in order to dynamically create a sprite(s) such that animation can be processed in 3D and the graphics generation system downstream determines whether to render using the 3D models or whether to create a 2D imposter model instead).
4. Then, for each entry in ImposterBin in order of desired depth sort:
   Reverse Projection screen box into world plane (block 322).
   Draw camera facing quad (i.e., the 2D surface can be defined with different orientation depending on virtual camera location) with sprite sheet texture cell (block 324).

Figure 7E:
FIG. 7E shows an exemplary illustrative non-limiting jump through special effect.

FIG. 7E shows an exemplary illustrative special effect that can allow the 2D representation to interact with other objects in the 3D world. In this example, z-bias hardware (see U.S. Pat. No. 6,664,958 entitled Z-Texturing, incorporated herein by reference) can be used to provide a "jumping through" effect that allows the two animated characters 50, 52 to appear to jump through an obstacle together while still being represented using the common 2D representation defined with a single common depth value Z.

While the technology herein has been described in connection with exemplary illustrative non-limiting embodiments, the invention is not to be limited by the disclosure. For example, the technology herein is applicable to real time or non-real time animation generation, interactive or non-interactive systems, video games, computer games, web page animation presentations, handheld devices such as cell phones, television and movies, or any application where computer generated animation is used. The invention is intended to be defined by the claims and to cover all corresponding and equivalent arrangements whether or not specifically disclosed herein.

We claim:

1. A method that in use is performed by a computer animation and graphics generation system of the type including a processor, a 3D graphics processor coupled to said processor, and a memory coupled to at least the processor, said 3D graphics processor projecting 3D objects onto a 2D viewing plane for display, said method comprising:
   defining, in the memory, a first 3D model representing a first moving object in a 3D virtual space;
   defining, in the memory, a second 3D model representing a second moving object in the 3D virtual space;
   using the processor and the 3D graphics processor to animate and render the first 3D moving object onto the 2D viewing plane for display;
   using the processor and the 3D graphics processor to animate and render the second 3D moving object onto the 2D viewing plane for display;
   with the processor, determining whether said first and second 3D moving objects overlap in the virtual 3D space;
   if the processor determines said first and second 3D moving objects overlap in the virtual 3D space, the processor substituting use of a common 2D imposter model instead of the first and second 3D models, the common 2D imposter model simultaneously modelling both of said overlapping first and second 3D moving objects; and
   using the common 2D imposter model to generate and render onto the 2D viewing plane an animated image of said first and second moving objects wherein the first moving object moves in front of the second moving object.

2. The method of claim 1 wherein said substituting comprises dynamically converting said respective first and second 3D models of said first and second 3D objects into the common 2D imposter model that models both of the first and second 3D objects, and texture mapping said common 2D imposter model.

3. The method of claim 1 further including projecting bounds of said first and second 3D objects onto the 2D viewing plane and performing said substitution only if said projected bounds are on the display.

4. The method of claim 1 wherein said substituting comprises creating a projection around a screen slot, reserving a slot in a sprite sheet, and drawing a 2D image entry of said first and second 3D objects into a corresponding slot in the sprite sheet.

5. The method of claim 1 wherein said generating comprises reverse projecting a screen box into a world plane, and imaging said world plane projection onto a virtual camera-facing quad with a sprite sheet texture cel.

6. The method of claim 1 further including responding in real time to user input in animating said first and second 3D characters.

7. The method of claim 1 wherein said animating is part of playing a game on a video game system.

8. The process of claim 1 wherein said determining comprises determining whether the first and second objects occupy the same space.

9. The process of claim 1 wherein said determining comprises determining whether the first and second objects occupy the same 3D space.

10. A computer animation and graphics generation system of the type including a processor, a 3D graphics processor coupled to said processor, and a memory coupled to at least the processor, said 3D graphics processor generating image information for display, said system for animating first and second 3D moving objects and comprising:

an overlap detection unit determining whether said first and second 3D objects overlap and if said plural 3D objects overlap, substituting a common 2D imposter model modeling each of the first and second objects in two dimensions in place of respective 3D models that model said first and second 3D objects in three dimensions for delivery to a graphics generator; and the graphics generator processing said 2D imposter model to generate an image of both the first and second objects for display at least in part in response to said processing.

11. The system of claim 10 wherein said overall detection unit converts said respective first and second 3D models of said first and second 3D objects into the common 2D imposter model.

12. The system of claim 10 further wherein said overlap detection unit projects bounds of said first and second 3D objects onto screen space and performs said substitution only if said projected bounds are on the display.

13. The system of claim 10 further wherein said overlap detection unit creates a projection around a screen slot, reserves a slot in a sprite sheet, and draws a 2D image entry of said first and second 3D objects into a corresponding slot in the sprite sheet.

14. The system of claim 10 wherein said graphics generator reverse projects a screen box into a world plane, and images said world projection plane onto a virtual camera-facing quad with a sprite sheet texture cel.

15. The system of claim 10 further including an input device manipulable by a user, said processor responding in real time to user input in animating said first and second 3D objects.

16. The system of claim 10 wherein said system is configured to accept input from a human game player.

17. The process of claim 10 wherein said overlap determining unit determines whether the first and second objects occupy the same space.

18. The process of claim 10 wherein said overlap determining unit determines whether the first and second objects occupy the same 3D space.

19. A non-transitory storage device for use by a computer animation and graphics generation system of the type including a processor, a 3D graphics processor coupled to said processor, and said storage device coupled to at least the processor, said 3D graphics processor generating image information for display, said storage device storing:

first instructions that determine whether first and second 3D objects overlap and if said first and second 3D objects overlap, substitute a common 2D imposter model for respective first and second 3D models of said first and second 3D objects;

second instructions that animate and project said 2D imposter model as a temporary replacement for separately animating and projecting the first and second 3D models; and third instructions that generate an image for display at least in part in response to said processing.

20. The storage medium of claim 19 wherein said first instructions dynamically create the 2D imposter model from the respective first and second 3D models.

21. A method that in use is performed by a computer animation and graphics generation system of the type including a processor, a graphics processor coupled to said processor, and a memory coupled to at least the processor, said method comprising:

defining, in the memory, a first 3D model of a first animated object and a second 3D model of a second animated object;

with the processor, determining whether said first and second 3D models when processed for display will at least overlap and partially occupy the same 3D space;

if the processor determines the first and second 3D models when processed for display will not at least overlap and partially occupy the same 3D space, using the graphics processor to separately process each of the first 3D model and the second 3D model for display; and if the processor determines said first and second 3D models when processed for display will at least partially overlap and occupy the same 3D space, dynamically creating and processing for display a common 2D imposter model simultaneously modeling both of said first and second animated objects to thereby avoid 3D spatial collision detection between the first and second 3D models.

22. The method of claim 21 wherein dynamically creating and processing comprises dynamically converting the first and second 3D models into the common 2D imposter sprite representing both the first and second animated objects, and the method further comprises the graphics engine texture-mapping the 2D sprite for display.

\* \* \* \* \*